US009217645B2

(12) United States Patent
Kandal

(10) Patent No.: US 9,217,645 B2
(45) Date of Patent: Dec. 22, 2015

(54) SYSTEM AND METHOD FOR WARNING A DRIVER OF TRAFFIC-RELATED FEATURES

(71) Applicant: Telenav GmbH, Berlin (DE)

(72) Inventor: Philipp Kandal, Tettnang (DE)

(73) Assignee: Telenav GmbH, Berlin (DE)

( * ) Notice: Subject to any disclaimer, the term of this patent is extended or adjusted under 35 U.S.C. 154(b) by 119 days.

(21) Appl. No.: 13/741,633

(22) Filed: Jan. 15, 2013

(65) Prior Publication Data

US 2013/0204519 A1    Aug. 8, 2013

(30) Foreign Application Priority Data

Feb. 8, 2012    (EP) ..................... 12154400

(51) Int. Cl.
*G01C 21/34*    (2006.01)
*G01C 21/32*    (2006.01)
*G08G 1/0967*    (2006.01)
*G01C 21/36*    (2006.01)

(52) U.S. Cl.
CPC ............ *G01C 21/34* (2013.01); *G01C 21/3697* (2013.01); *G08G 1/09675* (2013.01); *G08G 1/096725* (2013.01); *G08G 1/096775* (2013.01)

(58) Field of Classification Search
CPC .... G01C 21/34; G01C 21/20; G01C 21/3415; G01C 22/00; G01C 21/26; G01C 21/3617; G01C 21/30; G01C 21/3461; G01C 21/32; G01C 21/3629; G08G 1/096725; G08G 1/162; G08G 1/0965; G08G 1/168; G08G 1/096888; G08G 1/0962; G09B 29/106; B62D 15/029; B62D 15/025; G08B 21/06; G01S 19/34

USPC ........... 701/41, 410, 414, 465, 118, 416, 443, 701/532, 533; 340/932.2, 988; 342/451
See application file for complete search history.

(56) References Cited

U.S. PATENT DOCUMENTS

| | | | |
|---|---|---|---|
| 4,570,227 A * | 2/1986 | Tachi et al. ..................... 701/465 |
| 5,938,718 A * | 8/1999 | Morimoto et al. ............ 701/431 |
| 2003/0090392 A1* | 5/2003 | Schuessler ..................... 340/988 |
| 2005/0143915 A1* | 6/2005 | Odagawa et al. .............. 701/211 |
| 2007/0219688 A1* | 9/2007 | Gut et al. .......................... 701/41 |
| 2009/0105934 A1* | 4/2009 | Tajima et al. .................. 701/118 |
| 2009/0312942 A1* | 12/2009 | Froeberg ....................... 701/200 |
| 2010/0060486 A1* | 3/2010 | Nakashima et al. ........ 340/932.2 |
| 2010/0241353 A1* | 9/2010 | Park ............................... 701/208 |
| 2010/0324817 A1* | 12/2010 | Hansen et al. ................. 701/210 |

(Continued)

*Primary Examiner* — Tuan C. To
*Assistant Examiner* — Yuri Kan
(74) *Attorney, Agent, or Firm* — Sand & Sebolt

(57) ABSTRACT

A system and method for reducing the number of irrelevant warnings regarding traffic-related features for a non-navigation-guided trip including a position-determining device to determine a position of the vehicle from received signals; a storage device for storing map data representing courses of the roads; a route-calculating device for calculating a route along the courses of the roads; a receiver for receiving information regarding the nature and position of a traffic-related feature; a device for determining relevance of the information received based on whether an aerial distance of the position of the traffic-related feature from the vehicle falls within a first predetermined value; the aerial distance along a possible route falls within a second predetermined value and the number of turning maneuvers required falls within a predetermined maximum number; and a warning device for issuing a warning when these criteria are recognized as having been met in the relevance determining device.

6 Claims, 3 Drawing Sheets

(56) References Cited

U.S. PATENT DOCUMENTS

2010/0332120 A1* 12/2010 Tomobe et al. ............... 701/201
2011/0050503 A1* 3/2011 Fong et al. .................... 342/451
2012/0072108 A1* 3/2012 Kaes et al. .................... 701/416

* cited by examiner

SYSTEM AND METHOD FOR WARNING A DRIVER OF TRAFFIC-RELATED FEATURES

CROSS-REFERENCE TO RELATED APPLICATIONS

This application claims the benefit of EP 12154400.1, filed Feb. 8, 2012.

BACKGROUND OF THE INVENTION

1. Technical Field

The present invention relates to a system and a method for warning a driver of traffic-related features.

2. Background Information

Traffic-related features within the meaning of this invention are such events, occurrences or special conditions along the traffic routes that have a special impact on the traffic flow or the behavior required of a driver. This includes, in particular, traffic jams and traffic congestion, road works, accident sites, hazards due to pedestrians or animals in the vicinity of the roadway, and road closures, but also those points, at which speeds are being monitored, for example with stationary or mobile radar speed traps or other speed measuring systems. Such traffic-related features require that the driver of a vehicle drive in a particularly attentive manner, require a particularly meticulous observance of the permitted speed limit along the route or, especially conditions in the form of traffic jams, or require that an alternate route be considered in order to avoid such a traffic jam.

Today, with the aid of navigation devices, it is common for vehicle drivers to follow routes, which had previously been calculated by the navigation devices originating from a starting point to a destination point, and along which the vehicle driver is guided with the aid of the navigation device via voice prompts and/or visual displays. It is known thereby that corresponding navigation devices that determine and continuously monitor the position of the vehicle with the aid of satellite-supported navigation signals, in particular GPS signals, also receive information regarding the nature and position of corresponding traffic-related features, for example via signals transmitted by radio traffic, navigation or other services. A vehicle driver who drives along a specific route with the aid of a navigation device is then accordingly warned about traffic-related features on his route according to certain specifications.

Often, however, vehicle drivers do not wish to use the route navigation feature on a navigation device, e.g. if they are driving a familiar route, which they can negotiate without active navigation, since they are already familiar with the route to be selected or can determine and follow a route using other methods (for example on the basis of studying a map). Motor vehicle drivers feel disturbed by the repeated prompts or displays of a navigation device, for example when they are listening to music or an informative radio station during the drive, or even when they are just having a conversation with a passenger, in particular when navigation with the aid of such a navigation device or system is not necessary.

Regardless whether or not this device is used for actual navigation, many vehicle drivers own devices suited for navigation, whether they are separate navigation devices, or whether they are multifunction devices such as smartphones, for example, which these days are equipped with GPS receivers and can be made suitable for navigation by means of navigation software. These navigation devices are frequently brought along on such trips on which there is no active navigation.

Since a warning about relevant traffic-related features that may lie on the route taken by a vehicle driver is desirable even if active navigation is not done using route navigation, the use of appropriate navigation-enabled devices for these kinds of warning purposes has been considered. One option for doing so is described in the document WO 01/55744 A2. There it is described, based on an application for warning drivers of speed-measuring devices (for example radar speed traps), for which [radar speed traps] a warning is issued to a vehicle driver, taking into account a distance of the vehicle from the position where a speed-measuring device is installed and taking into account the measurement and driving direction. If the measurement and driving direction do not match, but the vehicle is within a certain distance from the position where the speed-measuring device is set up, however, a warning is also issued Further systems are known, in which warnings of traffic-related features such as speed-measuring devices are issued, dependent upon the aerial distance of the respective traffic-related feature from the position of the vehicle, if this aerial distance falls below a predetermined value. Likewise, there are solutions in which a check is made to determine whether the traffic-related feature is situated on a road along which the vehicle is currently travelling.

All of the aforementioned systems or methods, however, lead to a greater number of warnings of traffic-related features that lie on stretches of the road through which the vehicle driver will not even pass. Thus, for example, in the case of a warning exclusively regarding such traffic-related features as speed-measuring devices that fall within a specific perimeter at an aerial distance around the vehicle, a warning regarding a speed-measuring device that is set up on a nearby highway may be issued for a vehicle that is moving along a freeway, where, however, the vehicle driver will not pass through or does not intend to pass along this highway. A problem with the output of a large number of warnings that do not affect the vehicle driver along his or her route is that the vehicle driver will pay less attention to the warnings issued based on the number of irrelevant warnings, and will therefore attach less weight to the individual warnings or will fail to heed them. Thus warnings that are actually relevant to the driver may slip his or her attention.

BRIEF SUMMARY OF THE INVENTION

In order to prevent this, it is the objective of the invention to reduce the number of irrelevant warnings regarding traffic-related features on a trip without navigation guidance.

This objective is achieved by means of a system for warning a driver of traffic-related features according to the invention which comprises a position-determining device, a storage device, a route-calculating device, a receiver, a device for determining relevance, as well as a warning device.

The current position of the vehicle is determined by the position-determining device from the received signals, for example GPS signals. Map data representing the courses of the roads are stored in the storage device. The route-calculating device can calculate routes along the courses of the roads represented by the map data. The receiver is equipped to receive information regarding the nature and position of a traffic-related feature. Such information, for example, is transmitted by radio stations as encrypted traffic messages, however there are also other means of transmission, with which e.g. navigation system providers furnish their own datasets to appropriately configured receivers in their devices for example, e.g. via the Internet, to which appropriately equipped navigation devices are wirelessly connected.

The special feature of the system according to the invention is the fact that in the device for determining relevance, the relevance of the information is assessed based on specific information, namely:

i) based on the aerial distance of the position of the traffic-related feature from the position of the vehicle,
ii) based on the distance of the position of the traffic-related feature from the position of the vehicle along a possible route calculated by the route-calculating device,
iii) based on the number of turning maneuvers along the possible route calculated by the route-calculating device.

The system will only issue a warning to the vehicle driver via the warning device when at least the aerial distance falls within a first predetermined distance value, further the distance of the position of the traffic-related feature from the position of the vehicle along the calculated route additionally falls within a second predetermined distance value and additionally the number of turning maneuvers required falls within a predetermined maximum number.

Using this method, those traffic-related features are successively eliminated from a number of traffic-related features that may be relevant for the vehicle driver, for which the likelihood is low that they will lie on the route that the vehicle driver intends to follow. This makes it possible to avoid issuing an especially early warning regarding such traffic-related features that, while they fall within a predetermined route distance, lie at a distance that is especially far from the route. In addition, such traffic-related features are not taken into account that fall within a predetermined route distance, but where a greater number of turning maneuvers is needed to approach them. The likelihood that the vehicle driver will make the specific number of required turning maneuvers along the chosen route without the guidance of a navigation device is considered unlikely so that no warning is issued regarding such traffic-related features.

The concrete determination of the first predetermined distance value, of the second predetermined distance value and the maximum number of required turning maneuvers is made depending upon the nature of the traffic-related feature so that a warning can still be issued in a timely manner if the vehicle should nevertheless approach or turn towards the traffic-related feature, and so that adequate time to react to the respective traffic-related feature remains. Thus a warning regarding speed-measuring devices is not needed as early as a warning regarding a traffic jam or a road closure with respect to the distance of that feature [from the position of the vehicle], which the vehicle driver may seek to avoid if possible. Accordingly, when the traffic-related feature is a traffic jam or road closure, the first predetermined distance value and also the second predetermined distance value will be selected to be greater than, for example, would be selected in the case of a traffic-related feature such as a speed-measuring device. The predetermined maximum number of turning maneuvers can correspondingly be selected according to the nature of the traffic-related feature. Again, a greater number of possible turning maneuvers can be specified as a maximum number if warnings are to be issued regarding traffic jams or road closures than is the case for warnings issued regarding speed-measuring devices.

In the case of a warning regarding speed-measuring devices for example, an example of distance values could be 2 km for the first predetermined distance value and 1 km for the second distance value, as well as a maximum number of 2 for turning maneuvers. In the case of a warning regarding a traffic jam or a road closure as a traffic-related feature, on the other hand, a first predetermined distance value can be set to 50 km, a second predetermined distance value can be set to 30 km and a maximum number of required turning maneuvers can be set between 5 to 10. Other figures for these determinations are also possible. Values that fall within a range between 1 to 5 km for the first predetermined distance value, within a range, likewise, between 1 to 5 km for the second predetermined distance value, and with a maximum number of 1 to 5 turning maneuvers, have proven effective for warnings issued regarding speed-measuring devices. If, on the other hand, a warning is to be issued regarding a traffic jam or a road closure, values in a range between 20 to 150 km for the first predetermined distance value, in a range between 10 to 100 km for the second predetermined distance value, and with a maximum number of 2 to 10 turning maneuvers, have proven effective.

The system according to the invention can be realized, in a navigation device, for example, which is exclusively intended for positioning and possible route navigation. Similarly, it can also be realized by a multifunction device such as a smartphone, tablet PC, or the like, that has been equipped with appropriate software.

Moreover the system according to the invention with its device for determining relevance can be set up in such a way that the nature of the turning maneuvers that are required in order to follow the possible route calculated by the route-calculating device between the position of the vehicle and the position of the traffic-related feature, is determined using that device and evaluated with respect to the relevance, wherein the warning device only issues a warning to the vehicle driver when turning maneuvers of a predetermined nature are not required in order to follow the route. Such turning maneuvers may include reversing maneuvers to change driving direction (U-turns), for example, but also include turning maneuvers that are carried out in rapid succession in the same direction, for example two or three successively performed left turns. This is because there is a low likelihood that a vehicle driver will perform a reversing maneuver along a route, for example, and then drive in the direction of a traffic-related feature.

Furthermore, the system can be advantageously configured in its receiver in such a way that information regarding a driving direction, along which the traffic-related feature occurs, can also be received. For example in the case of a traffic jam or a road closure, this traffic jam or road closure may only be relevant to one driving direction along a section of the road, while the road in the other direction is freely passable. In the case of speed-measuring devices as well, it is frequently only possible to measure in a single direction, for example in the case of stationary radar speed traps, which constantly monitor a stretch of the road in one direction, and therefore only monitor vehicles travelling in a specific direction.

The system is then set up in such a way, with respect to its device for determining relevance, that the driving direction that the vehicle must follow along the calculated route is compared with the driving direction along which the traffic-related feature occurs, and the warning device only then issues a warning signal to a vehicle driver when the aforesaid driving directions coincide.

If a warning regarding a speed-measuring device occurs, this can be advantageously coupled with the display of a maximum permitted speed, which is obtained from the map data stored in the storage device for the stretch of road being monitored by the speed-measuring device. In this way, the vehicle driver is not only warned of the presence of a speed measurement system, but at the same time is also made aware of the maximum permitted speed limit. If the system is also set up to detect the current speed of the vehicle (for example in the case of a permanently installed device that is connected with the vehicle odometer, or in the case of a device that is separate from the vehicle, having a corresponding device for determining a speed of movement based on the temporal change of the position determined by means of received signals), an additional warning can be issued, for example an acoustic signal, when the vehicle driver exceeds the permitted speed limit with his or her vehicle in the section of road in which the speed-measuring device is set up.

A method according to the invention operates with the following steps:

The position of the vehicle is determined based on received signals. Position data representing the position of a traffic-related feature is received as well as data that represents the nature of the traffic-related feature. First, an aerial distance between the position of the vehicle and the position of the traffic-related feature is determined. If this aerial distance falls within a first predetermined maximum value, a route is calculated that associates the position of the vehicle with the position of the traffic-related feature along the course of a road. A route distance between the position of the vehicle and the position of the traffic-related feature along this route is determined. If this route distance falls within a second predetermined maximum value, the number of turning maneuvers to be performed along this route is determined. Finally, if this number also falls within a third predetermined maximum value, a warning is issued to the vehicle driver. In the method, the first and second predetermined maximum values correspond to the first and second predetermined distance values described with respect to the system and can assume the aforementioned values with respect to each of the specified traffic-related features. The third predetermined maximum value corresponds to the maximum number with respect to the system and can also assume the value specified there with respect to the respective traffic-related features.

The method can be further refined in that during the step, in which the number of turning maneuvers required in order to follow the route is determined, not only this number, but also the respective type of such a turning maneuver is determined. The type, as already described above, is understood as a distinction based on a reversal of the driving direction (U-turn), for example, or a rapid succession of turning maneuvers in a row, especially those made in the same direction. Only when specific, predetermined types of turns are not included among the required turning maneuvers, will a warning be issued to the vehicle driver according to this embodiment of the method.

Finally, the driving direction, in which the traffic-related feature occurs, can also be taken into account with this method, in that corresponding data is received and this driving direction is additionally taken into consideration when determining the route distance and/or determining the number of turning maneuvers. If the driving directions do not coincide or if a different number and different types of turning maneuvers are required due to the different driving directions, a warning can be omitted.

BRIEF DESCRIPTION OF SEVERAL VIEWS OF THE DRAWINGS

Further advantages and features of the invention will become apparent from the following description of an embodiment based on the accompanying figures.

Schematic illustrations are provided in the figures, based on which an embodiment or possible variants of this embodiment for a system and method according to the invention are subsequently explained.

DETAILED DESCRIPTION OF THE INVENTION

Figure 1:
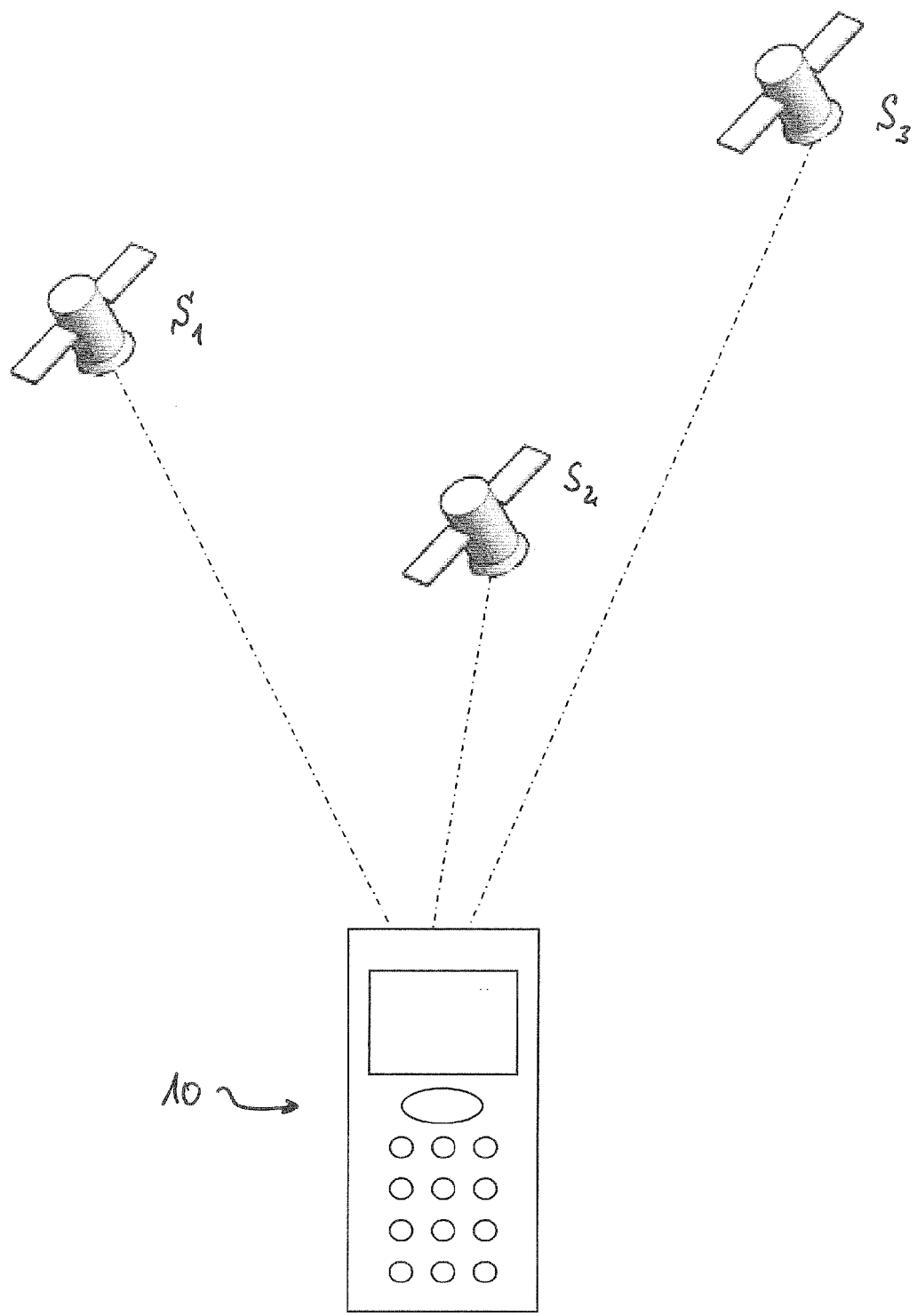
FIG. 1 presents a schematic representation of a navigation device interacting with satellites that emit position signals, e.g. of the GPS system.

In FIG. 1, a navigation device is generically designated as 10. The navigation device 10 is represented here as a mobile phone, which features a GPS receiver and which can determine position data. In addition, navigation software is also stored on this mobile phone with data representing map data for the courses of the roads of a predetermined area as well as a route calculation algorithm for calculating routes from a first position point to a second position point along the courses of the roads represented by the map data. Depicted in FIG. 1 is the fact that the navigation device 10, which is designed as a mobile phone, is connected with satellites $S_1$, $S_2$, $S_3$ of the GPS system via corresponding wireless signal links. The navigation device 10 determines the position via the signals received from these satellites $S_1$ to $S_3$.

The navigation device 10 can be used for active route navigation by entering a destination, for which navigation is to be provided. Navigation is then performed via speech output and the output of corresponding navigation symbols on the display.

Figure 2:
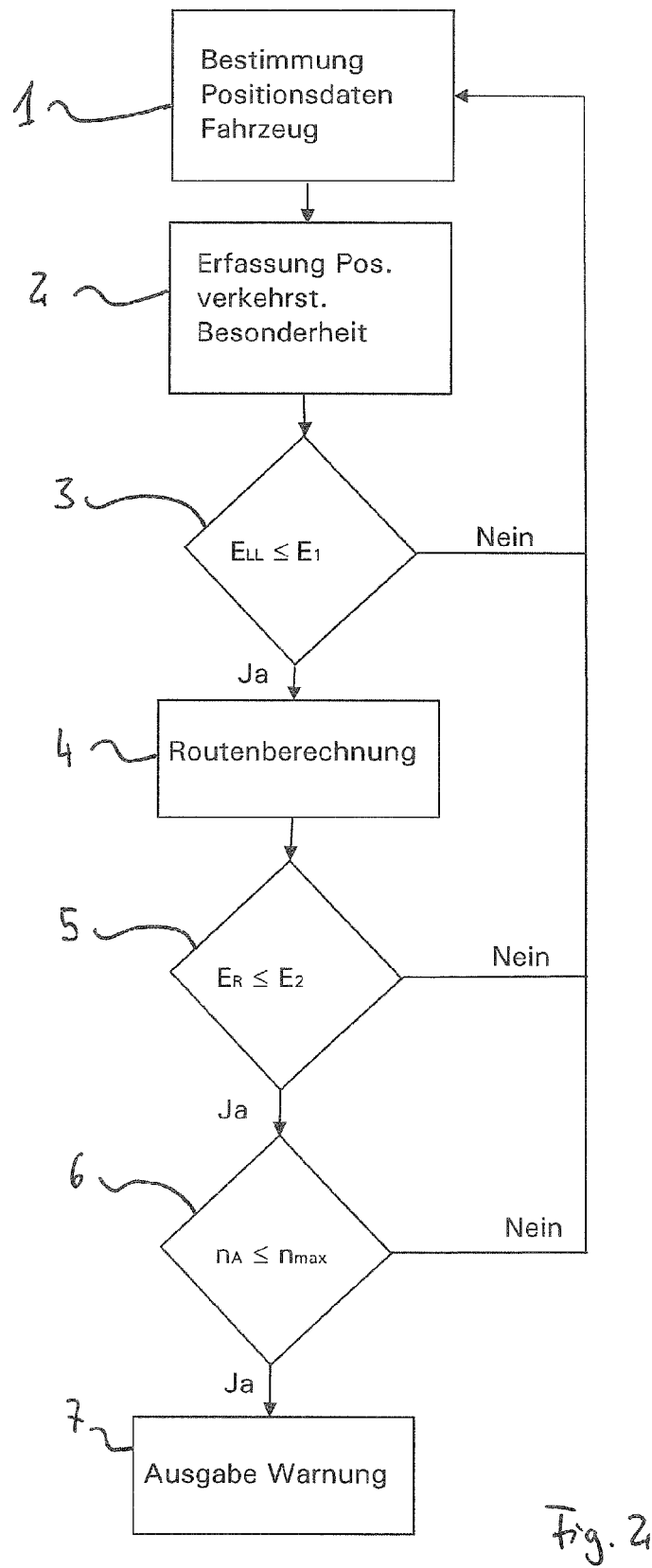
FIG. 2 schematically depicts the process flow in an embodiment of the invention.

Within the context of the invention, the navigation device 10 can also warn of traffic-related features that are located in a relevant catchment area of the vehicle originating from its current position when no active route navigation is performed. To this end, a procedure runs in the navigation device 10, illustrated based on the flowchart according to FIG. 2. If such a warning function is activated, the navigation device 10 first determines the position data for the vehicle in step 1 by determining its own position via the GPS system and equating this position to the position of the vehicle. Because this position determination occurs continuously or at least in sections within a short period of time, the navigation device 10 can also determine a change in the position data, and, in any case, derive therefrom the movement or driving direction of the vehicle, and where applicable, can also determine the speed at which the vehicle is travelling along the route based on the temporal change in the position.

In the next step (which may also be executed at the same time as step 1), which is designated here as 2, the navigation device 10 detects the positions of traffic-related features. This detection occurs in particular by receiving wirelessly transmitted signals representing the positions of traffic-related features, which are distributed for example by traffic information stations, but also by other providers. In step 3, if messages regarding traffic-related features such as traffic jams, road closures, hazardous areas, road works, accident sites or speed-measuring devices exist and are detected, an initial check is made to determine whether a distance calculated as the crow flies (aerial distance) $E_{LL}$ is less than or equal to the value of the predetermined distance value $E_1$. If this is not the case, the process returns to step 1 and runs through the routine again. If an aerial distance $E_{LL}$ corresponding to the abovementioned criterion is detected, a route calculation of a possible route between the position of the vehicle and the position of the traffic-related feature detected is next performed in the navigation device 10. This occurs in step 4. A new query is subsequently made in step 5, wherein a check is made to determine whether a route distance $E_R$, i.e. a distance from the position of the vehicle to the position of the traffic-related feature along the calculated route is less than or equal to a second predetermined distance value $E_2$. If this is not the case, the process returns to step 1 and runs through the routine again. If it is determined that the route distance $E_R$ is less than or equal to the second distance value $E_2$, an additional query is made in the next step 6. Here it is determined whether the number of turning maneuvers required along the calculated route, the number of which is designated here as $n_A$, is less than or equal to a predetermined maximum number $n_{max}$. If this is not the case, the process returns to step 1 and runs through the routine again. If it is the case, a warning is issued in step 7.

The distance values $E_1$ and $E_2$ as well as the maximum number of turning maneuvers $n_{max}$ are determined based on empirical values and in particular based on the nature and the kinds of traffic-related features detected. If, for example, these features are traffic jams or road closures, higher distance values $E_1$ and $E_2$ are to be assumed, for example a distance of 150 km for $E_1$ and 50 km for $E_2$ or the like, than for other kinds of traffic-related features such as speed-measuring devices. There, significantly lower distance values should be selected, for example a distance value $E_1$ of 2 km and a distance value $E_2$ of 1 km. A different selection must also be made for the maximum number of possible turning maneuvers. In the case of traffic jams or road closures, as a rule, a higher value will be chosen, for example 5, whereas in the case of warnings regarding speed-measuring devices, a lower value will be provided, e.g. an $n_{max}$ of 2 or 3.

In addition (and not shown here), during step 6 it is possible to check what kinds of turning maneuvers must be performed in order to follow the route from the detected position of the vehicle to the position of the traffic-related feature. If these include turning maneuvers of a specific, excluded type, it may be necessary for the procedure to jump back to step 1, regardless of the criterion of an otherwise lower number, e.g. if reversing maneuvers (U-turns) are required.

At any point after step 4 a check can also be made in terms of the driving direction to determine whether a traffic-related feature that exists for only one specific diving direction corresponds to the current driving direction of the vehicle, which takes the vehicle past this feature. If this is not the case, it is also possible to exit the process sequence and return to step 1 in order to enter the process again.

Figure 3:
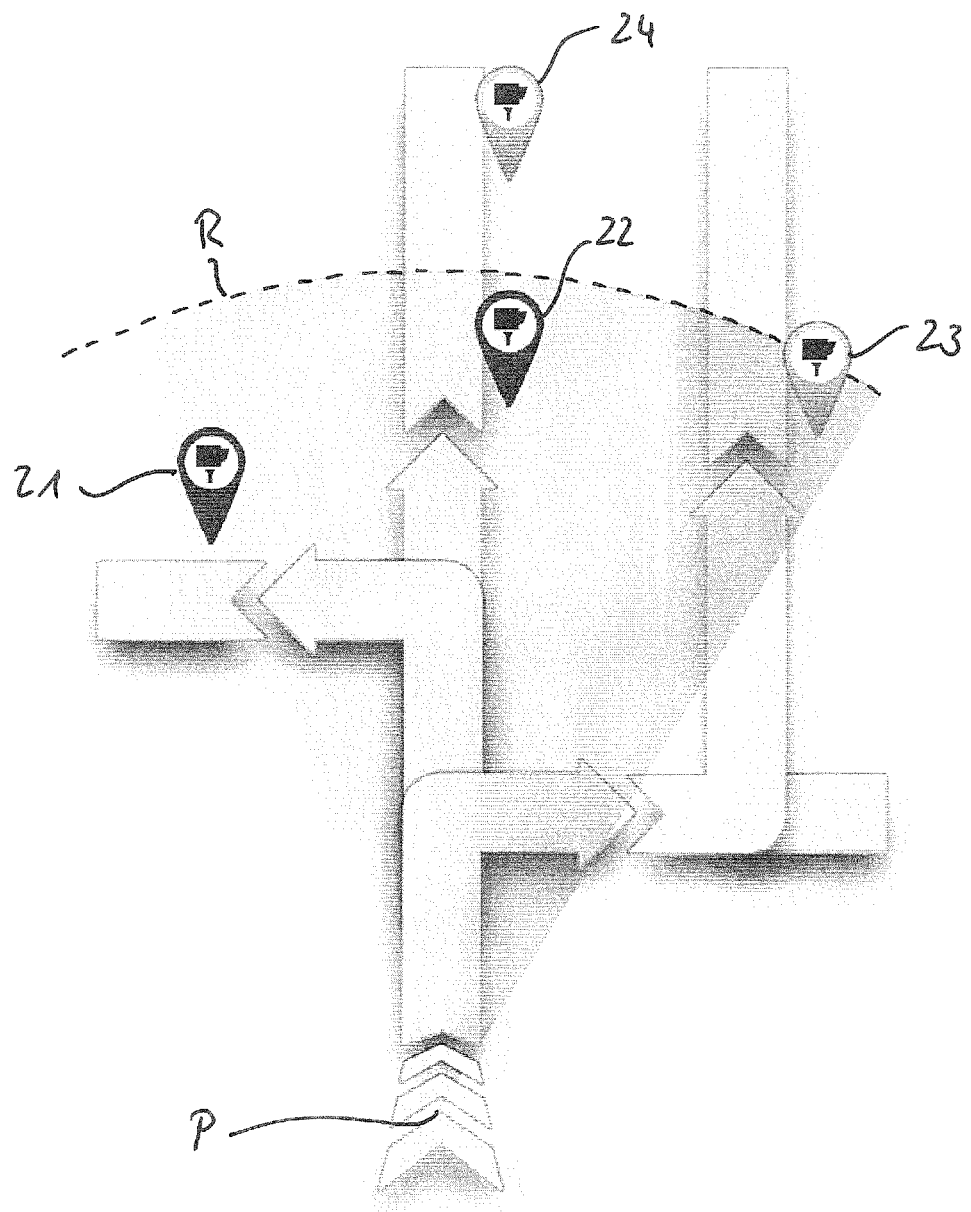
FIG. 3 presents a schematic overview of possible positions of traffic-metering devices as an example of traffic-related features in relation to a position P of the vehicle.

FIG. 3 illustrates this process again based on a different schematic representation. There, P indicates the current position of the vehicle. 21, 22, 23 and 24 refer here to speed-measuring devices, for example, in this case radar speed traps, with their respective installation sites along the courses of the roads, which are indicated here with different arrows. A radius R is inscribed around the position P of the vehicle as an aerial distance which equals the maximum, first predetermined distance $E_1$. As can be seen, the radar speed traps 21, 22 and 23 fall within this radius R. The radar speed trap 24, the position of which can also be detected by the navigation device, falls outside of the radius R and therefore is not considered further for the warning process. Moreover, the system has calculated the various routes that lead to the radar speed traps 21, 22 or 23 respectively. While the route to the radar speed trap 22 simply runs straight ahead, thus without turning maneuvers, a single left turn is required to reach the radar speed trap 21, and to reach the radar speed trap 23, a right turn and subsequent left turn are required. All three radar speed traps fall within a predetermined distance $E_2$ along the respective route. In this simplified example, the maximum number of turning maneuvers $n_{max}$ is set to 1 so that the radar speed traps 21 and 22, which are marked as dark in the figure, meet the criterion $n_A \leq n_{max}$, however the radar speed trap 23 fails to do so. No warning is used regarding this radar speed trap 23 according to the inventive process sequence and with the system according to the invention, and a warning is only issued regarding the radar speed traps 21 and 22. If the vehicle then continues to follow its route straight to the position at which a turn should be made in the direction of the radar speed trap 21, the radar speed trap 21 would be excluded from the warning because a reversing turn (U-turn), would be needed to reach the radar speed trap 21, and a warning would only be issued prior to radar speed trap 22, and prior to radar speed trap 24, if radar speed trap 24 were to end up in the radius R.

Based on this example and the illustration, it is once again made clear how a warning regarding a variety of traffic-related features is prevented with the inventive system and the inventive process, and only those traffic-related features are included in the warning that lie on the non-navigation-guided route of the vehicle.

REFERENCE LIST

1 step
2 step
3 step
4 step
5 step
6 step
7 step
10 navigation device
21 radar speed trap
22 radar speed trap
23 radar speed trap
24 radar speed trap
$E_{LL}$ aerial distance
$E_R$ route distance
$E_1$ first distance value
$E_2$ second distance value
$n_A$ number of turning maneuvers
$n_{max}$ maximum number
P position of the vehicle
R aerial radius
$S_1, S_2, S_3$ satellite

The invention claimed is:

1. A system for warning a driver of traffic-related features comprising:
   a) position-determining device which is set up to determine a position representing the position of a vehicle from received signals;
   b) a storage device for storing map data representing courses of roads;
   c) a route-calculating device for calculating a possible route along the courses of the roads represented by the map data;
   d) a receiver for receiving information regarding a nature and position of a traffic-related feature;
   e) a device for determining relevance which is set up to determine relevance of the information received by the receiver based on the following criteria:
      i) whether an aerial distance of the position of the traffic-related feature from the position of the vehicle falls within a first predetermined distance value; and
      ii) whether the distance of the position of the traffic-related feature from the position of the vehicle along the possible route calculated by the route-calculating device falls within a second predetermined distance value; and iii) whether a number of turning maneuvers required along the possible route between the position of the vehicle and the position of the traffic-related feature, calculated by the route-calculating device, falls within a predetermined maximum number; and f) a warning device for issuing a warning to the vehicle's driver when criteria i) to iii) are recognized as having been met in the device for determining relevance; and wherein the system functions without providing active navigation or guidance to the driver of the vehicle.

2. The system according to claim 1, wherein the device for determining relevance is also set up to determine the kind of turning maneuvers required to follow the possible route between the position of the vehicle and the position of the traffic-related feature calculated by the route-calculating device, and wherein the warning device is set up to issue a warning to the vehicle's driver only when turning maneuvers of a predetermined type are not needed in order to follow the route.

3. The system according to claim 1, wherein the receiver is also set up to receive information regarding a driving direction in which the traffic-related feature exists and wherein the device for determining relevance is also set up to compare the driving direction along the route between the position of the vehicle and the position of the traffic-related feature calculated by the route-calculating device with the driving direction in which the traffic-related feature exists, and wherein the warning device is set up in such a way that it only issues a warning to the vehicle's driver when the specified driving directions coincide.

4. A method for warning a driver of a vehicle of traffic-related features utilizing a warning system for warning a driver of traffic related features comprising:
   a) position-determining device which is set up to determine a position representing the position of a vehicle from received signals;
   b) a storage device for storing map data representing courses of roads;
   c) a route-calculating device for calculating a possible route along the courses of the roads represented by the map data;
   d) a receiver for receiving information regarding a nature and position of a traffic-related feature; and
   e) a device for determining relevance which is set up to determine relevance of the information received by the receiver; where the warning system is mounted in the vehicle, said method having the following steps:
   i) determination of a position of the vehicle based on signals received by the position-determining device of the warning system;
   ii) receiving on the receiver position data representing the position a traffic-related feature;
   iii) determination of an aerial distance between the position of the vehicle and the position of the traffic-related feature utilizing programming in the warning system;
   iv) calculation by the route-calculating device of a possible route between the position of the vehicle and the position of the traffic-related feature if the aerial distance determined in step iii) falls within a first predetermined maximum value, and determination of a route distance along the calculated possible route between the position of the vehicle and the position of the traffic-related feature;
   v) determination by the device for determining relevance of a number of turning maneuvers required in order to follow the possible route between the position of the vehicle and the position of the traffic-related feature, when the route distance determined in step iv) falls within a second, predetermined maximum value; and
   vi) vi issuing a warning, utilizing the warning device, to the vehicle's driver in step v) when the number of turning maneuvers falls within a third predetermined maximum value; and wherein no active navigational guidance is undertaken during the performance of steps i) to vi).

5. The method according to claim 4, wherein in addition in step e), a type of respective turning maneuver required is determined by the device for determining relevance and wherein the warning issued by the warning device in step f) is only issued when turning maneuvers of a specific, predetermined type are not among the necessary turning maneuvers.

6. The method according to claim 4, wherein in addition in step b), data representing a driving direction in which the traffic-related feature exists is received by the receiver and in step d) and/or e), the driving direction is taken into account in which the traffic-related feature exists when determining the route distance and/or determining the number of turning maneuvers.

* * * * *

UNITED STATES PATENT AND TRADEMARK OFFICE
CERTIFICATE OF CORRECTION

PATENT NO.         : 9,217,645 B2                                    Page 1 of 1
APPLICATION NO.    : 13/741633
DATED              : December 22, 2015
INVENTOR(S)        : Philipp Kandal It is certified that error appears in the above-identified patent and that said Letters Patent is hereby corrected as shown below:

In the Claims:

Column 10, line 26 (Claim 4): "vi) vi" should be replaced with --vi)--.

Signed and Sealed this
Nineteenth Day of April, 2016

Michelle K. Lee
*Director of the United States Patent and Trademark Office*